(No Model.)

F. E. SPENCER.
CRATE.

No. 428,152.          Patented May 20, 1890.

WITNESSES:
Wm S. Cornwell
J. G. Shaw

INVENTOR:
Frank E. Spencer
Per, E. Horton
Attorney

UNITED STATES PATENT OFFICE.

FRANK E. SPENCER, OF PENN YAN, NEW YORK.

CRATE.

SPECIFICATION forming part of Letters Patent No. 428,152, dated May 20, 1890.

Application filed January 14, 1890. Serial No. 336,874. (No model.)

*To all whom it may concern:*

Be it known that I, FRANK E. SPENCER, a citizen of the United States, residing at Penn Yan, in the county of Yates and State of New York, have invented certain new and useful Improvements in Crates, of which the following is a specification.

My invention relates to an apparatus for sustaining or cushioning fruit packed in crates; and it consists of the novel construction of devices and parts, substantially as hereinafter fully described, and particularly pointed out in the claims.

The object of my invention is to provide an apparatus for sustaining or cushioning packed fruit by the application of movable or elastic supports therefor. It is arranged for connection with old crates as well as crates made specially for the purpose, so that fruit in its ripe and delicious state can better withstand the jar necessary in transportation, thus effecting an economy in its ready adaptation to any crate and in the quality of the fruit after shipment.

Figure 1:
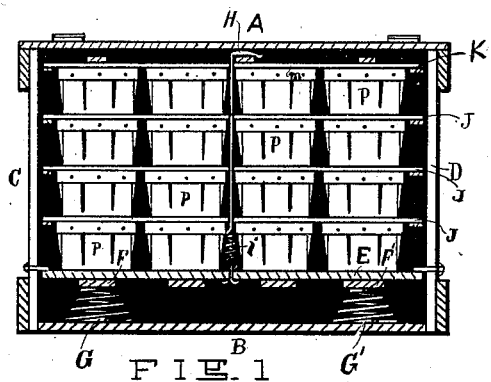
Figure 2:
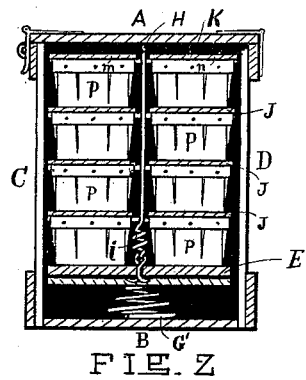
Figure 3:
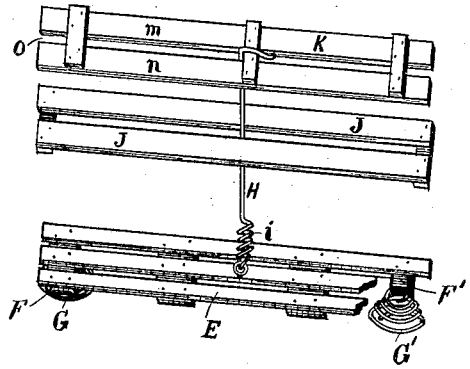

In the drawings hereto annexed, which illustrate devices embodying my invention, Figure 1 is a sectional view of my invention in combination with a crate of ordinary construction cut longitudinally on a vertical line through the center of the crate. Fig. 2 is a transverse sectional elevation of the same. Fig. 3 is a view in detail of the secondary movable bottom and lid, showing one of the separating-layers in its proper relative position between them and their connecting mechanism and springs.

I will now describe the construction and arrangement of the parts of my invention.

Referring to the drawings, in which like letters of reference denote corresponding parts in all the figures, A B C D designate a crate of the kind of construction as frequently heretofore used.

E represents a movable secondary bottom of dimensions to be easily inserted within its crate to carry the fruit P upon it, and which may be made in various ways; but to have it light and secure good ventilation for the fruit I make it openly of slats nailed together, crossing each other at right angles. Secured to the cross-slats F F' of this movable bottom are springs G G', which rest upon and react from the bottom B of the crate. This extra bottom E is further provided with a spring hook or clamp H, attached at one end to one of the central slats of said bottom, coiled into one or more rings $i$, which spring apart when the rod is drawn up for adjustment of its hook end proportionally to the distance of the hook from its attached end at the bottom E. The upper or free end of said hook is bent to pass over the central cross-slat of the lid K.

J represents a separating layer or partition similar to the bottom E, to be used alternately with baskets, one above another, in filling the crate. It is evident that such a layer or partition may be made of paper, wood, or other material, and in numerous ways, according to the material made use of. Such a one as I have chosen to illustrate, however, is made of wooden slats of sufficient width to retain small fruit in baskets covered by them, and small cross-slats rigidly secured to them in manner similar to the bottom heretofore described. Following the final tier of baskets to fully cover the fruit in them is a secondary cover or lid K, with cross-slats uniting it. One of them is situated to receive the spring-hook H over it through the slot O between the base-slats M N.

In lieu of providing the bottom E with spiral springs G G', resting upon and reacting against the bottom of the crate, other devices for its support may be substituted and affixed to the crate in some other manner. I prefer, however, to employ the spiral springs G G', as they are not so liable to get out of place or broken, and are more convenient in their adaptation to all kinds of crates.

I am aware that crates have been made provided with a series of close-fitting internal boxes in contact with each other, carried by a false bottom cushioned with springs. Such I do not claim; but What I do claim, and wish to secure by Letters Patent of the United States, is—

1. In a crate A B C D, the movable or secondary bottom E, supported by springs G G', and having the rod H attached thereto, in combination with layers J, interposed baskets P, and cover K, to which the rod H is attached, substantially as described.

2. In combination with the crate A B C D, the false bottom E and cover K, the adjustable rod H, which connects the same, separating-layers J between them, and springs G G', seated beneath and supporting the bottom E, substantially as described.

3. A crate having the false bottom E and cover K, having separating-layers J between them, the rod H, connecting said cover and bottom, and having suitable mechanism for adjustment in relation to the distance between its attaching ends, substantially as described.

FRANK E. SPENCER.

Witnesses:
E. HORTON,
C. S. BELL.